US 6,707,939 B1

(12) United States Patent
Weinholz et al.

(10) Patent No.: US 6,707,939 B1
(45) Date of Patent: Mar. 16, 2004

(54) METHOD FOR IMAGE DATA COMPRESSION FOR TWO-COLOR IMAGES

(75) Inventors: Peter Weinholz, Kiel (DE); Eike Siemsen, Kiel (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 640 days.

(21) Appl. No.: 09/694,434

(22) Filed: Oct. 23, 2000

Related U.S. Application Data (63) Continuation of application No. PCT/DE99/01016, filed on Apr. 3, 1999.

(30) Foreign Application Priority Data

Apr. 21, 1998 (DE) ............................ 198 17 720

(51) Int. Cl.[7] .......................... G06K 9/00; G06K 9/62; G06K 9/36
(52) U.S. Cl. .................. 382/164; 382/166; 382/224; 382/245; 382/248
(58) Field of Search ............... 382/162, 164, 382/165, 166, 173, 224, 232, 239, 244, 245, 248; 375/240.12, 240.18, 240.23, 240.24; 348/14.12, 14.13, 14.14, 469, 471, 564, 563, 565; 358/426.01, 426.16

(56) References Cited

U.S. PATENT DOCUMENTS

| 4,530,004 A | * | 7/1985 | Achiha et al. ............... 348/450 |
| 4,538,187 A | * | 8/1985 | Rehfeldt ....................... 386/27 |
| 4,562,484 A | * | 12/1985 | Rallapalli et al. ......... 358/426.16 |
| 4,654,484 A | * | 3/1987 | Reiffel et al. ............. 348/14.13 |
| 4,675,721 A | * | 6/1987 | Dirr ........................... 348/471 |
| 4,982,288 A | * | 1/1991 | Isobe et al. ................. 348/565 |
| RE33,632 E | * | 7/1991 | Nakamura et al. ...... 358/426.16 |
| 5,267,333 A | | 11/1993 | Aono et al. .................. 382/166 |
| 5,612,748 A | * | 3/1997 | Gohshi et al. ........... 375/240.21 |
| 5,644,406 A | | 7/1997 | Harrington et al. ........ 382/239 |
| 5,706,368 A | | 1/1998 | Mita ........................... 382/284 |
| 6,205,255 B1 | * | 3/2001 | Mak ............................ 382/245 |
| 6,594,385 B2 | * | 7/2003 | Grohs et al. ................. 382/166 |

FOREIGN PATENT DOCUMENTS

| DE | 34 14 455 C2 | 10/1984 | ............. G06T/7/00 |
| DE | 34 19 693 C3 | 11/1984 | |
| EP | 0 491 556 A2 | 6/1992 | ............. H04N/1/41 |
| EP | 0 680 030 A1 | 11/1995 | ............. G09G/5/02 |
| JP | 58-1377 | 1/1983 | ............. H04N/1/46 |
| JP | 59-110274 | 6/1984 | ............. H04N/1/46 |
| JP | 07-274026 | 10/1995 | ............. H04N/1/60 |

OTHER PUBLICATIONS

"Color Graphics Picture Segmentation", IBM Technical Disclosure Bulletin, vol. 32, No. 3B, Aug. 1989.

* cited by examiner

Primary Examiner—Andrew W. Johns
Assistant Examiner—Amir Alavi
(74) Attorney, Agent, or Firm—Laurence A. Greenberg; Werner H. Stemer; Gregory L. Mayback (57) ABSTRACT

A method for compressing digital image data present as matrix of M×N pixels, to a reduced data set, includes dividing the matrix of M×N pixels into blocks of u×v pixels, classifying the blocks of u×v pixels into blocks containing only pixels of one block color or single-color blocks, blocks containing pixels of a foreground color and pixels of a background color or two-color blocks, and blocks containing pixels with more than two colors or multicolor blocks, and coding, in the image data of the single-color blocks and the two-color blocks, by command code words and data words, pixel patterns which are repeated in at least one manner selected from the group consisting of from block to block and within a block, respectively.

14 Claims, 7 Drawing Sheets

Run Length 1  63

Fig 5 w = 0: Repetition of the Line Distribution
w = 1: New Line Distribution Pattern

Fig. 6

In Data Words (4):
0 = Background Color
1 = Foreground Color

METHOD FOR IMAGE DATA COMPRESSION FOR TWO-COLOR IMAGES

CROSS-REFERENCE TO RELATED APPLICATION

This is a continuation of copending International Application PCT/DE99/01016, filed Apr. 3, 1999, which designated the United States.

BACKGROUND OF THE INVENTION

Field of the Invention

The invention relates to the art of digital image processing, and to a method for compressing image data of a digitally produced or stored image to a reduced data set. Compression methods for image data are used in many fields of application of digital image processing so that, as a consequence of the reduced data set that results therefrom, storage space, data transmission time, processing time and resultant costs are reduced.

An important field of application is electronic reproduction technology, in which very large image data sets are processed. In reproduction technology, printing originals are produced for printed pages which contain all the page elements to be printed, such as texts, graphics and images. In the case of the electronic production of the printing originals, these elements are present in the form of digital data. The data are produced for an image, for example, by scanning the image in a scanner by point and line, decomposing each pixel into color components and digitizing the color values of these components. The data for texts and graphics are generally produced directly in a computer by text-processing and drawing programs. Depending upon the subsequently employed output process, for example outputting on a color printer or printing in a conventional printing machine, the data for the page elements are produced and stored in the color components of red, green and blue (RGB) or in the printing inks of four-color printing, specifically cyan, magenta, yellow and black (CMYK).

In the further operating sequence, the digitized texts, graphics and images are electronically assembled at a processing station under visual control on a color monitor or automatically in accordance with stored layout stipulations, i.e., the page elements are assembled, for example, in a storage area of the processing station in accordance with the layout to form a printed page. The finished printed page is converted, in this regard, into a data format suitable for outputting, and stored. The printed-page data for each of the printing inks (RGB or CMYK) are denoted as color separation data. The color separation data are used to produce printing plates for a conventional printing machine, or are transmitted directly to a fast color printer or to a digital printing machine and printed out thereat. For example, 24 pixels/mm (600 pixels/inch), constitute a sufficient resolution for the color separation data of the printed pages. If four color values are stored per pixel (CMYK), and the densities of the color values are digitized using 8 bits (=1 byte), respectively, the result for a printed page of size DIN A4 is a data set of 210 mm×297 mm×24×24×4=143, 700, 480 bytes, (1) i.e., approximately 144 megabytes. This data set is further multiplied by the number of pages in a printed product. It is therefore necessary to process very large data sets in accordance with electronic reproduction technology. Consequently, an important role is played by methods for effectively compressing these data sets.

It is possible to distinguish areas having two types of image data on printed pages: firstly, areas containing a great many different colors changing from pixel to pixel, for example, scanned images, and secondly, areas containing only two colors, for example, text or graphics. Even in areas containing more than two colors, for example, colored graphics, there are frequently subareas with only two colors. Different compression methods have become known heretofore for the two types of image data, and they are optimized for the respective type, i.e., they attain a compression factor which is as high as possible, and do not at all or only slightly falsify the image information.

Methods of transformational coding have become known heretofore for compressing the image data in areas with many different colors. In this regard, the image data are divided into blocks of, for example, 8×8 pixels, the blocks are transformed into a frequency representation (similar to the Fourier transformation) and only the frequency components relevant to the image information are stored in coded form. Such an expanded method is known by the designation JPEG (Joint Photographic Engineers Group) and has been internationally standardized.

The published European Patent Application EP-A-0 491 556 describes an extended transformation coding wherein image data blocks are additionally detected which have a uniform color, for example, the background color white. Such blocks are not subjected to transformational coding, but the positions thereof are coded with the aid of arithmetic coding, and inserted into the transformationally coded data of the remaining blocks. Moreover, an edge detector is used to detect pixels which are situated at the edges of graphic characters, and the color and position thereof are likewise coded by arithmetic coding.

Methods of run length coding wherein the position and the length-of-line sections with pixels of the same color are coded have become known heretofore for the purpose of compressing the image data in areas with two colors. There are run length codings which operate in one dimension and in two dimensions. In the case of the one-dimensional methods, pixels of the same color which are consecutive in a scanning line are counted, and these run lengths are stored as code words. In the case of the two-dimensional methods, the deviations of the run lengths in the current scanning line from the corresponding run lengths of the preceding scanning line are coded. For both types of run length coding, there are methods which are very widespread and standardized in facsimile transmission technology. A further method which is suitable for compressing image data with two colors has become known by the designation LZW (Lempel, Ziv, Welch). In this case, repeating sequences of pixels, which need not all be of the same color, are coded.

U.S. Pat. No. 5,267,333 describes a method for image data compression wherein images and partial images are sorted manually according to categories of text, background image and foreground image. Different compression methods are applied, respectively, for the three categories, both transformational codings and the standardized facsimile codings. The heretofore known methods for compressing image data with two colors have the disadvantage in that they cannot be combined in a simple manner with a transformational coding for image data with many colors. Moreover, the compression of the heretofore known methods for two-color image data is not effective enough in the case of the high resolutions which are used in electronic reproduction technology. Basically, the transformational coding could also be applied to the entire printed page. However, the compression factor then attainable in the two-color image areas would be low, and the decompressed image data would furthermore be affected by intolerable errors. Conversely, it would also be possible, for example, to apply the LZW method to the entire printed page. The attainable compression factor would then be low in the multicolor image areas.

SUMMARY OF THE INVENTION

It is therefore an object of the invention of the instant application to avoid the disadvantages of the heretofore-known methods for compressing two-color image data by providing a method for compressing two-color image data without errors, which is effective and relatively easy to implement, and which is suitable for combination with a transformational coding for the purpose of compressing multicolor image data.

With the foregoing and other objects in view, there is provided, in accordance with the invention, a method for compressing digital image data present as a matrix of M×N pixels, to a reduced data set, which comprises dividing the matrix of M×N pixels into blocks of u×v pixels, classifying the blocks of u×v pixels into blocks containing only pixels of one block color or single-color blocks, blocks containing pixels of a foreground color and pixels of a background color or two-color blocks, and blocks containing pixels with more than two colors or multicolor blocks, and coding, in the image data of the single-color blocks and the two-color blocks, by command code words and data words, pixel patterns which are repeated in at least one manner selected from the group consisting of from block to block and within a block, respectively.

In accordance with another mode, the method invention includes coding consecutive single-color blocks with a like block color as that of run lengths.

In accordance with a further mode, the method invention includes coding the two-color blocks as bit patterns, assigning to each bit of the bit pattern a pixel of the two-color block, the bits of the bit pattern indicating whether the assigned pixel has one of the foreground color and the background color, respectively.

In accordance with an added mode, the method invention includes forming the bit pattern only with bits for the pixels of such lines of the two-color block, the distribution of foreground color and background color of which is different from the corresponding distribution in the preceding line of the two-color block.

In accordance with an additional mode, the method invention includes forming the bit pattern only with bits for a subset of undersampled pixels of the two-color block.

In accordance with yet another mode, the method invention includes coding consecutive two-color blocks with a like bit pattern as that of run lengths.

In accordance with yet a further mode, the method invention includes providing the single-color blocks in different regions of the image data with a different block color.

In accordance with yet an added mode, the method invention includes providing that the foreground color and the background color are different in different regions of the image data.

In accordance with yet an additional mode, the method invention includes coding as run lengths, consecutive multicolor blocks that are supposed to be skipped in the compression of the single-color blocks and the two-color blocks.

In accordance with still another mode, the method invention includes compressing the multicolor blocks by using a method of transformational coding.

In accordance with still a further mode, the method invention includes avoiding compression of the multicolor blocks.

In accordance with still an added mode, the method invention includes replacing a portion of the pixels in a multicolor block by the background color, and then coding the block like a two-color block.

In accordance with still an additional mode, the method invention includes replacing a portion of the pixels in a multicolor block by an arbitrary color, and then coding the block like a multicolor block.

In accordance with a concomitant mode, the method invention includes coding one of the properties of transparency and nontransparency, respectively, for the background color.

Other features which are considered as characteristic for the invention are set forth in the appended claims.

Although the invention is illustrated and described herein as embodied in a method for image data compression for two-color images, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 4a) and 4b) illustrate the coding of the block color of a single-color block;

DESCRIPTION OF THE PREFERRED EMBODIMENTS

Figure 1:
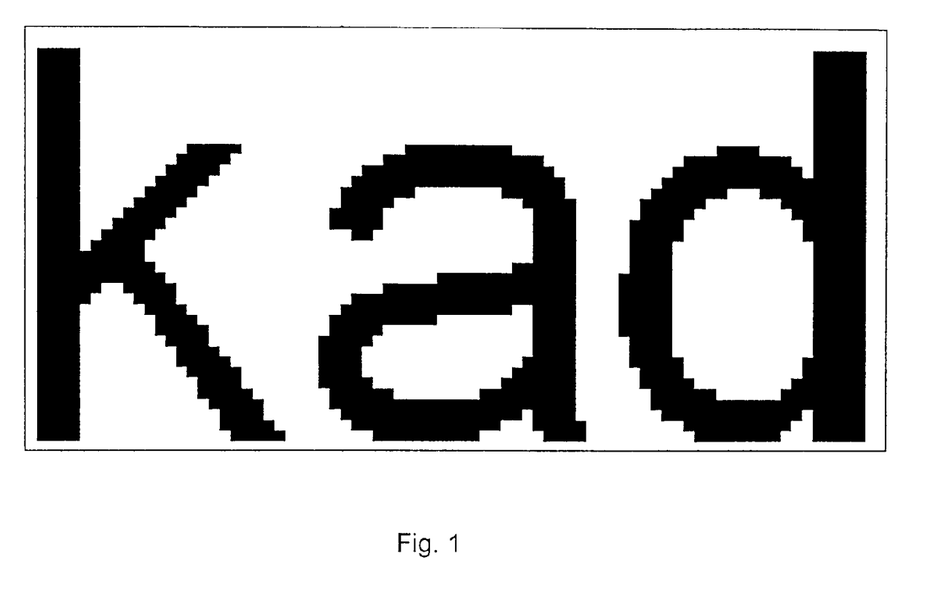
FIG. 1 is an enlarged fragmentary view of an image area with two colors.

Referring now to the drawings and, first, particularly to FIG. 1 thereof, there is shown therein an enlarged section of an image region with two colors, in this case a black text on a white background. The colors of the two-color image area thus here are, therefore, black as foreground color and white as background color. The two colors could also be any other colors, for example, dark blue as foreground color and bright yellow as background color. It is assumed hereinbelow that the image data are present separated according to the color separation components (RGB or CMYK) thereof, i.e., for an RGB image with N lines and M pixels per line and one byte per color component, all the red components of the pixels are combined to form a color separation image of M×N bytes. Likewise, all the green components and all the blue components of the image are respectively combined to form a color separation image of M×N bytes. These color separation images can be considered for the compression of the image data as three separate "gray-scale images" of, respectively, M×N bytes, except that the byte values in this case are not actual gray-scale values, but density values of the corresponding printing inks. In a preferred mode of the compression method according to the invention for two-color image data, the color separation images are compressed separately. This can be performed in parallel by a plurality of compression units, or successively by one compression unit. This preferred mode of the method is described hereinbelow, it being assumed that a color separation image to be compressed is present as a matrix of M×N bytes.

Figure 2:
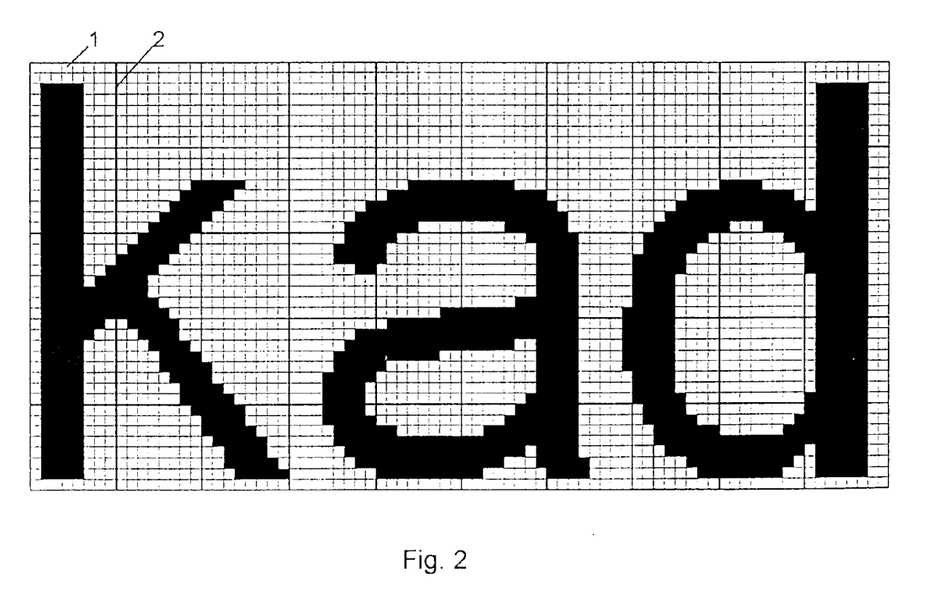
FIG. 2 is a view like that of FIG. 1, showing the two-color image area divided into pixels and blocks of pixels.

FIG. 2 shows the pixels 1 of a color separation image of the section shown in FIG. 1. The pixels 1 are combined into blocks 2, preferably blocks with 8×8 pixels, using the method according to the invention. It is believed to be apparent from the example of FIG. 2 that blocks 2 are present wherein all of the pixels 1 have only one color. Such blocks 2 are denoted as single-color blocks. In addition thereto, there are blocks wherein both pixels of the foreground color and pixels of the background color are present. Such blocks are denoted as two-color blocks.

Horizontally consecutive blocks are coded in sequence in the image during compression. One or more consecutive code words are used to code the colors, run lengths, block structures and so forth. Each code word sequence is formed either of a command code word alone or of a command code word and following data words. The command code word informs whether data words follow and how many of them there are, as the case may be. The first bits in a command code word uniquely mark what is coded by the code word sequence. All command code words and all data words, respectively, are one byte long.

Figure 3:
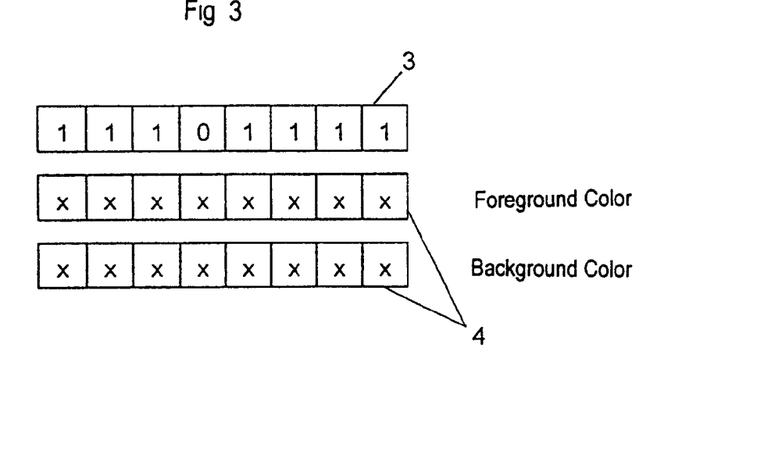
FIG. 3 illustrates the coding of the foreground color and background color of a two-color block.

FIG. 3 illustrates the code word sequence for coding the foreground color and the background color in the two-color blocks. It is formed of a command code word 3 and two following data words 4. The first data word is the density of the foreground color in the color separation image currently being processed. The second data word is the corresponding density of the background color. This code word sequence is stored once in the compressed data at the start of the compression. It is inserted anew into the compressed data when the foreground color or background color changes. Thus, for the decompression operation, the coded colors are valid for all following two-color blocks until a new code word sequence for coding the foreground color and background color occurs.

Figures 4A, 4B:
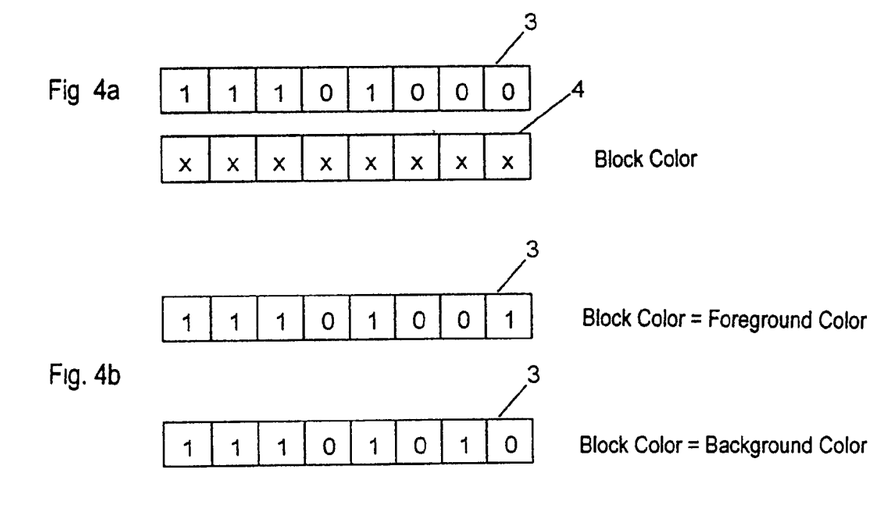

FIGS. 4a and 4b illustrate two possibilities provided for coding the block color of the single-color blocks. One coding possibility is provided by a command code word 3 followed by a data word 4 which specifies the density of the block color (note FIG. 4a). The other, more compact coding possibility is used when the foreground color and background color of the two-color blocks has already been stored in the compressed data. One of two possible command code words 3, without a following data word, is used to code whether the block color is the same as the foreground color or the same as the background color of the two-color blocks (note FIG. 4b). The coding of the block color is also valid for all following single-color blocks until the block color changes and a new coding of the block color is inserted into the compressed data.

Figure 5:
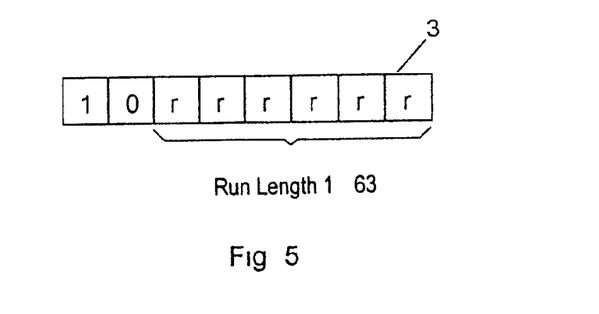
FIG. 5 illustrates the coding of a sequence of single-color blocks.

FIG. 5 illustrates the coding for consecutive single-color blocks of the same color. In the last 6 bits, a command code word 3 contains a run length of 1 to 63 which indicates how many single-color blocks of the same color follow consecutively. If a sequence of single-color blocks is longer than 63, it is divided into a plurality of run lengths of length 63 and a residual run length. For each partial run length, a command code word according to FIG. 5 is inserted into the compressed data. In the example of FIG. 2, the topmost block sequence has a run length of single-color blocks with the background color.

Figure 6:
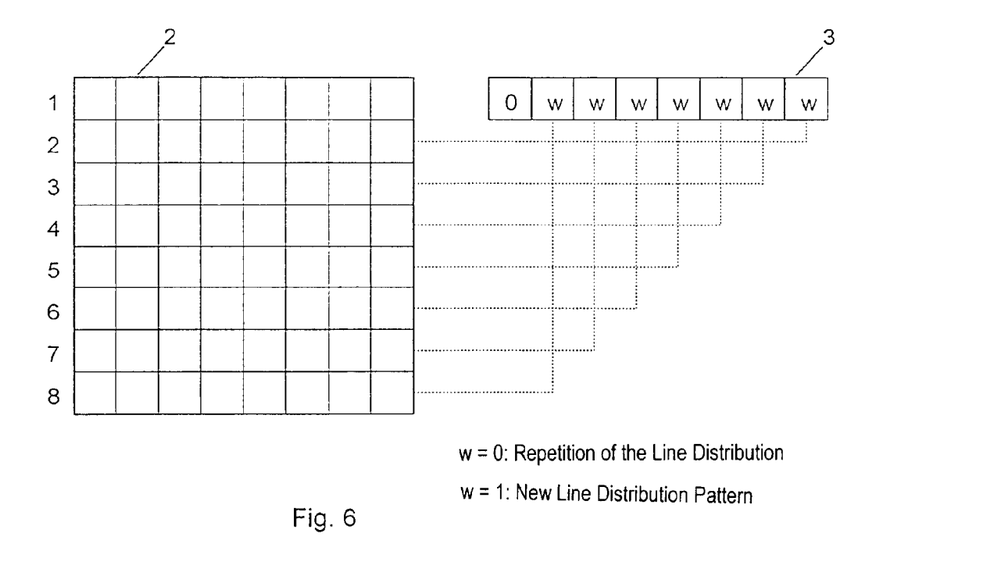
FIG. 6 illustrates the formation of the command code word for a two-color block.

FIG. 6 illustrates the formation or design of the command code word 3 for coding a two-color block 2. According to the method of the invention, a two-color block is checked as to whether the distribution pattern of foreground color and background color in lines 2 to 8, respectively, of the block 2 is like the distribution in the preceding line, or is different. This information is coded in the last 7 bits of the command code word. To each of the lines 2 to 8 in the block 2, there is assigned one of the last 7 bits in the command code word 3. A logical 0 in the bit indicates that the corresponding line is a repetition of the preceding line. A logical 1 indicates that the corresponding line contains a new pattern of foreground color and background color. The distribution pattern of the first line in the block and of those lines 2 to 8 which are not repetitions are appended as data words to the command code word 3.

Figure 7:
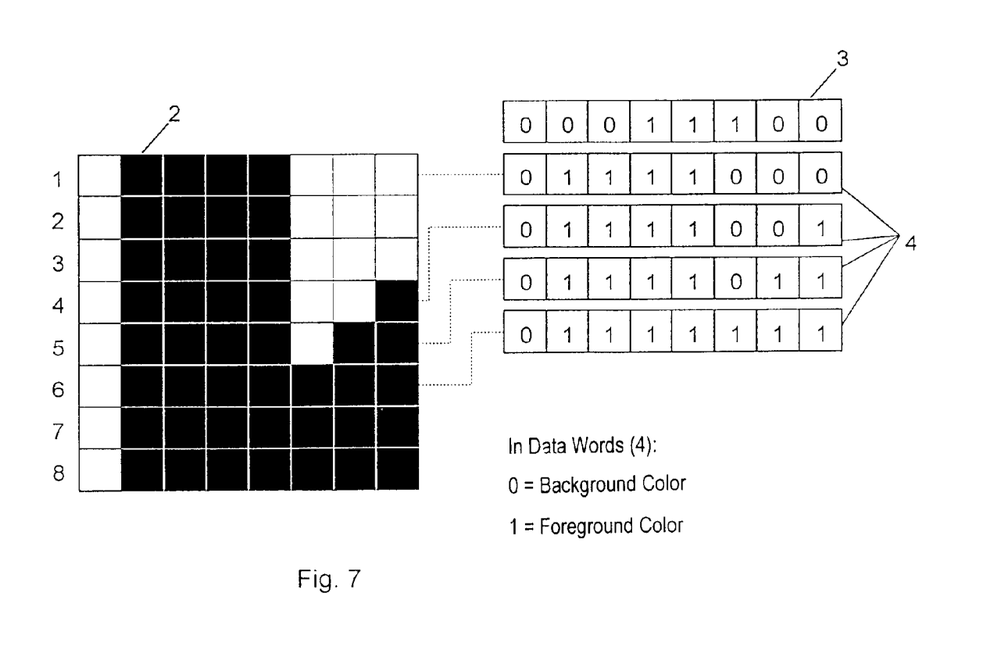
FIG. 7 illustrates an example of the coding of a two-color block.

FIG. 7 illustrates the coding of a two-color block once again with reference to an example. The command code word 3 contains in the last and the last-but-one bit a logical 0, because the lines 2 and 3 of the block 2 are repetitions of line 1. The lines 4, 5 and 6 contain a new distribution pattern of foreground and background color by comparison with the, respectively, preceding line. The appertaining bits in the command code word are therefore set to a logical 1. The lines 7 and 8 are repetitions of line 6. The appertaining bits in the command code word are therefore set to a logical 0. Consequently, four data words 4 follow the command code word in the example. The data words contain bit patterns for the nonrepeating lines 1, 4, 5 and 6. Each bit in a bit pattern stands for a corresponding pixel and indicates whether the pixel contains the background color (=logical 0) or contains the foreground color (=logical 1). The coding for a two-color block therefore is formed of a command code word followed by 1 to 8 data words. The first data word is always the bit pattern for line 1, and the number and line assignment of the remaining data words follows from the last 7 bits of the command code word.

Figures 8, 9A:
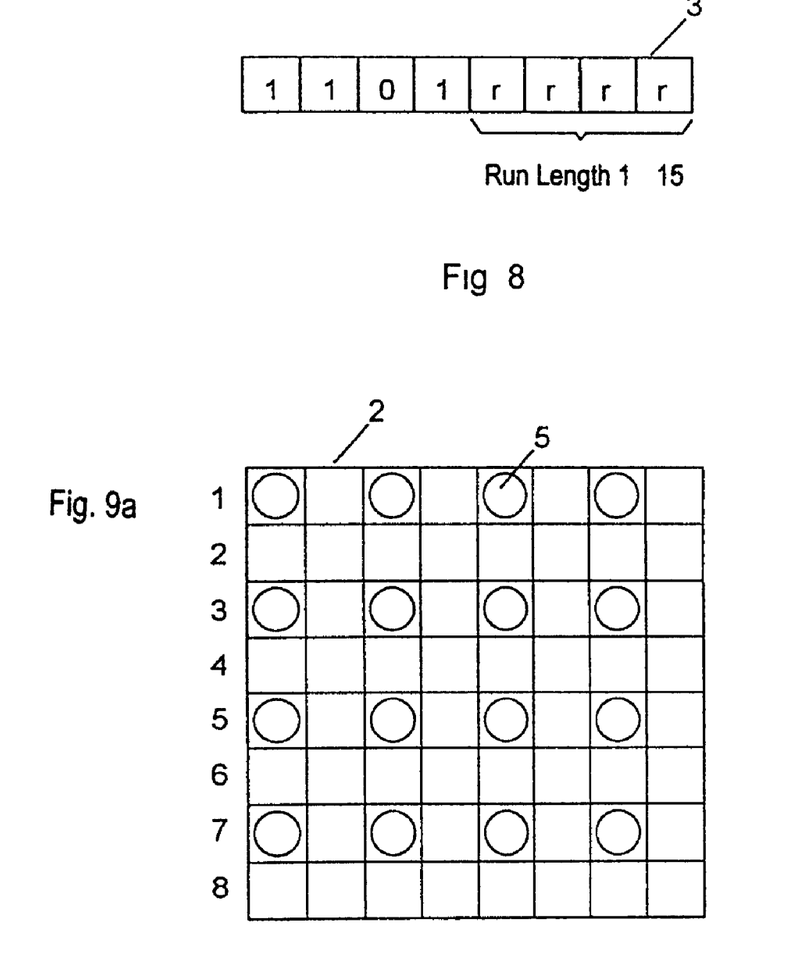
FIG. 8 illustrates the coding of a sequence of two-color blocks.
FIGS. 9a) and 9b) illustrate the coding of a two-color block with an undersampling by a factor of 2.

FIG. 8 illustrates the coding for a sequence of identical two-color blocks, such as can occur in the case of a horizontal line in a text or a graphic. In the last 4 bits, a command code word 3 contains a run length of 1 to 15, which specifies how often the last-coded two-color block is repeated. Alternatively, the run length can also specify how often the last-coded two-color block is repeated. As to which alternative is selected is a question of the outlay or expense for implementation. If a sequence is longer than 15, it is divided into a plurality of run lengths, respectively, having a length of 15 and a residual run length, and the coding is repeated with an appropriate frequency.

In printed pages, there are areas with two-color image data for which a lower resolution can be tolerated. These are areas in which two closely adjacent colors are present, i.e., the contrast between the two colors is very slight. Such areas are, for example, color gradations which include a uniform transition from one color to another color over a relatively large surface. It is true that many intermediate colors are present, but in a local area having the size of a few 8×8 blocks, there are actually only two colors, as a rule. In such areas, the compression can be even further increased by also reducing the resolution. The compression method according to the invention provides special codings for such a case.

Figure 9B:
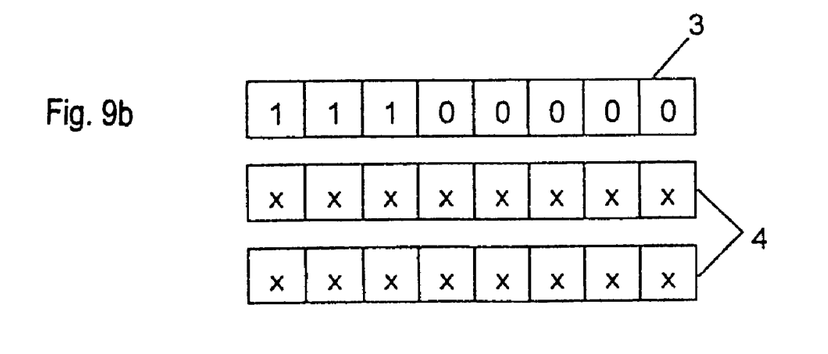

FIG. 9a illustrates a two-color block 2 having a resolution which is reduced in the horizontal and the vertical directions by undersampling by a factor of 2. For this purpose, only the colors of the pixels 5 marked with a circle are coded. FIG. 9b illustrates the appertaining code word sequence, which is formed of a command code word 3 and two data words 4. Each of the 16 bits in the two data words has one of the undersampled pixels 5 assigned thereto, and the bit indicates whether the corresponding pixel contains the background color (=logical 0), or contains the foreground color (=logical 1). In the interest of providing a relatively simple realization, there is no provision, in the case of this two-color block coding with a reduced resolution, for checking whether lines of the block are repeated in the vertical direction, because the image data would not thereby be capable of considerably further compression. A different mode of the method of the invention with such a check and corresponding coding analogous to a two-color block with a reduction in the resolution (note FIG. 6 and FIG. 7) is, however, entirely conceivable.

Figure 10A:
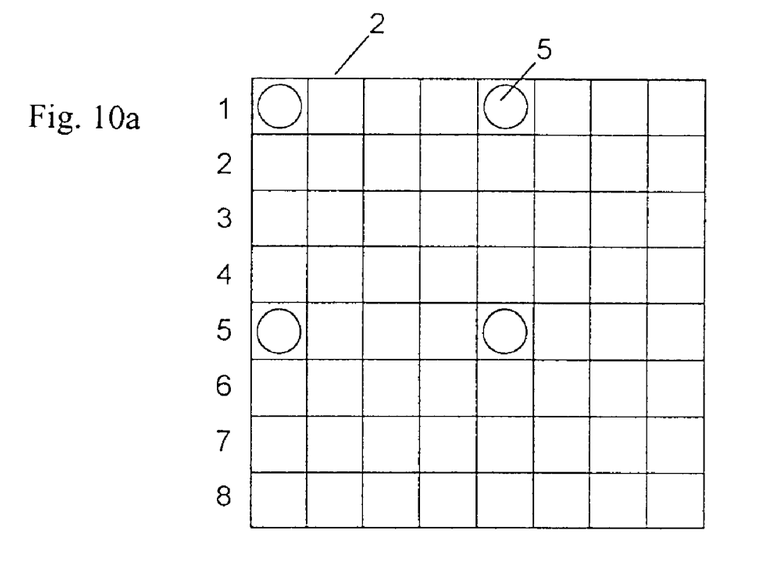
FIGS. 10a) and 10b) illustrate the coding of a two-color block with an undersampling by a factor of 4.
Figure 10B:
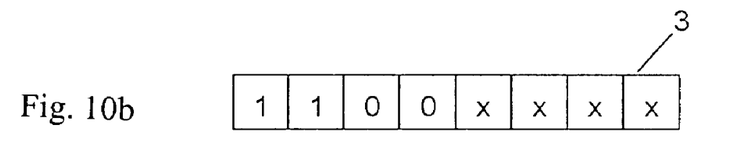

FIG. 10 illustrates the coding for the case wherein the resolution of a two-color block is reduced in the horizontal and the vertical directions by a factor of 4. The undersampled pixels 5 are marked with a circle in FIG. 10a. FIG. 10b shows the appertaining coding, which is formed of a command code word 3 wherein the last four bits, respectively, have one of the undersampled pixels 5 assigned thereto, and the bit indicates whether the corresponding pixel contains the background color (=logical 0) or contains the foreground color (=logical 1). A sequence of identical two-color blocks with reduced resolution is likewise coded as run length in accordance with FIG. 8.

Because the compression method according to the invention for two-color image data operates with blocks of preferably 8×8 pixels, it is very well suited for a combination with a transformational coding such as, for example, the JPEG method for multicolor image data, which likewise operates with blocks of 8×8 pixels. If the image data contain both areas with many colors (typically images) and areas with only two colors (typically text and graphics), they can initially be divided into blocks of 8×8 pixels independently of the compression method to be applied later. A simple analysis before the compression establishes for each block whether it contains pixels with many colors or pixels with only two or only one color. The multicolor blocks are then compressed, for example, using the JPEG method, and the single-color or two-color blocks are compressed using the method according to the invention. Both types of block are coded in this manner with a high compression factor and very good image quality. The single-color and the two-color blocks are compressed, in this regard, without loss of quality (if no reduction in the resolution is undertaken), which is of particular importance for text and graphics.

Further provided for the combination with a transformational coding for multicolor blocks in the compression method according to the invention are special code words which facilitate cooperation with another compression method for multicolor blocks.

Figure 11:
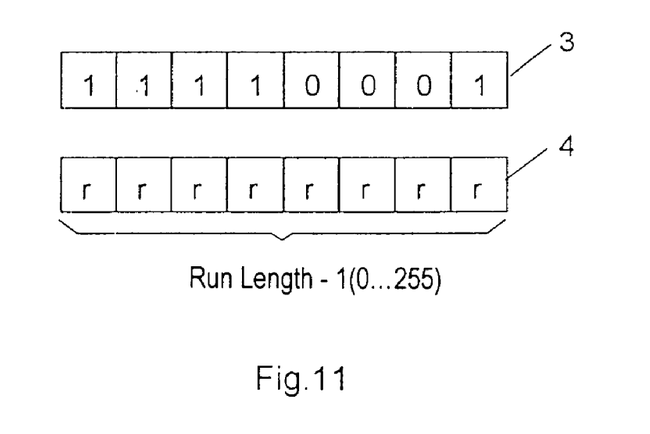
FIG. 11 illustrates the coding for skipping a sequence of multicolor blocks.

FIG. 11 illustrates the coding for the case wherein a specific number of multicolor blocks are supposed to be skipped, those multicolor blocks being situated between the last-coded single-color or two-color block and the next single-color or two-color block to be coded. A command code word 3 is followed by a data word 4 which contains a number from 0 to 255. This number specifies the run length, reduced by one, of the multicolor blocks to be skipped.

It frequently happens, in pixels which contain both images and text, that single-color text is superimposed on an image. This gives rise to 8×8 blocks of which a portion of the pixels is multicolored, and the remaining portion of the pixels is single-colored. If such blocks are compressed by using the JPEG method, the text edges would be falsified due to the reconstruction errors typical of a transformational coding during decompression. The text would lose the edge definition thereof. The text component in the 8×8 block can be compressed without error by using the method according to the invention. For this purpose, the mixed multicolor/single-color block is split up into two partial blocks, of which one partial block contains the multicolored pixels of the image component, and the other partial block contains the single-colored pixels of the text component.

Figure 12:
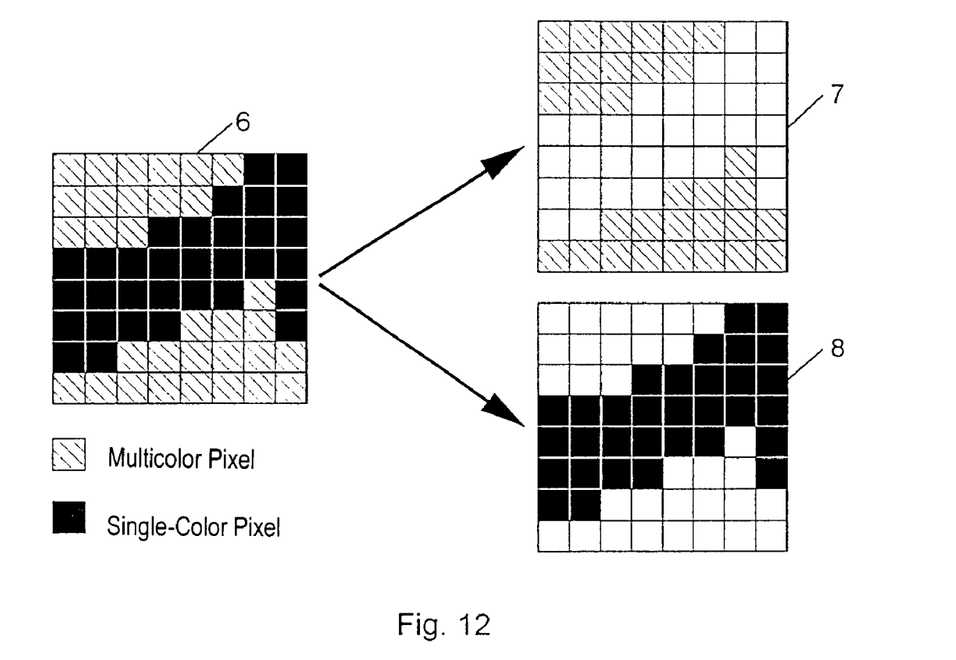
FIG. 12 shows the division of a multicolor/single-color block into a multicolor partial block and a two-color partial block.
Figure 13:
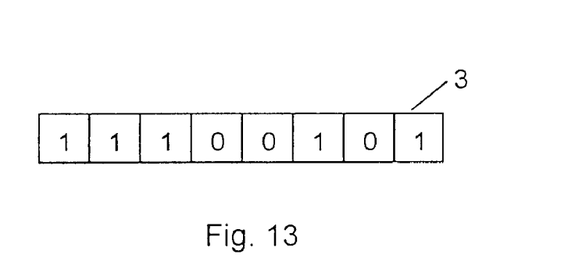
FIG. 13 illustrates the coding for the transparency of the background color in two-color blocks.
Figure 14:
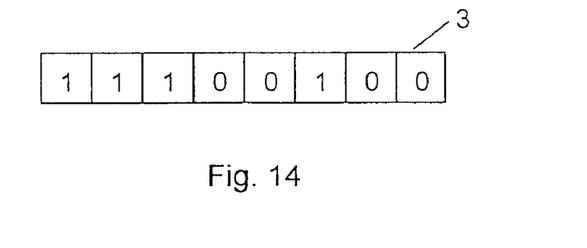
FIG. 14 illustrates the coding for the nontransparency of the background color in two-color blocks.

FIG. 12 shows the division of a multicolor/single-color block 6 into a multicolor partial block 7 and a two-color partial block 8. In order to form the two-color partial block, the multicolor pixels are replaced by the background color. The multicolor partial block 7 is compressed by using the JPEG method, and the two-color partial block 8 is compressed by using the method according to the invention in accordance with FIG. 6 and FIG. 7. In contrast with a normal two-color block, however, the pixels with the background color are filled up during the decompression with the pixels of the decompressed multicolor partial block. In order to transmit to the decompression device the information regarding the other treatment of the background color, a command code word for "transparency" is inserted. It signifies that in the following two-color blocks the pixels with the background color are to be treated as transparent when the decompressed two-color partial block is superimposed on the decompressed multicolor partial block, in order to reconstruct the mixed multicolor/single-color block. FIG. 13 illustrates the command code word 3 for transparency. A command code word for "nontransparency" is inserted for switching back to the nontransparent mode. It signifies that in the following two-color blocks the background color is to be treated as nontransparent, i.e., as was explained in conjunction with FIG. 6 and FIG. 7. FIG. 14 illustrates the command code word 3 for nontransparency.

Figure 15:
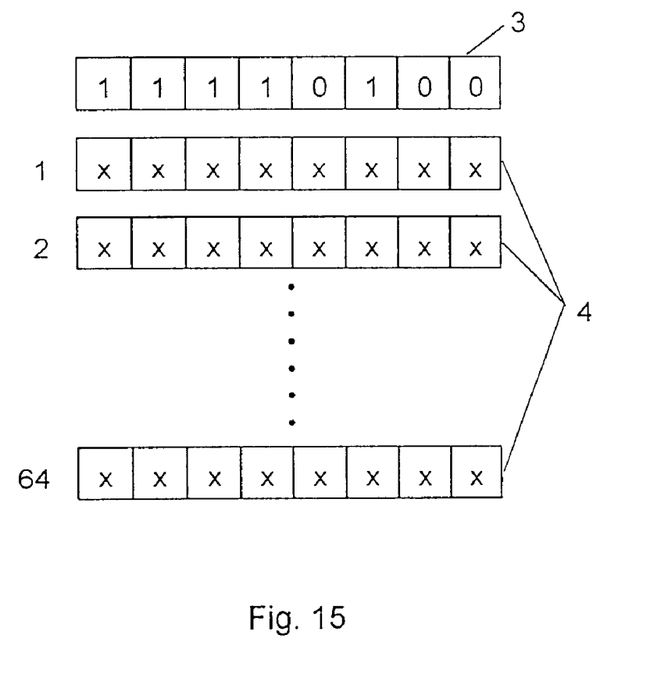
FIG. 15 shows the coding for the "direct" mode.
Figure 16:
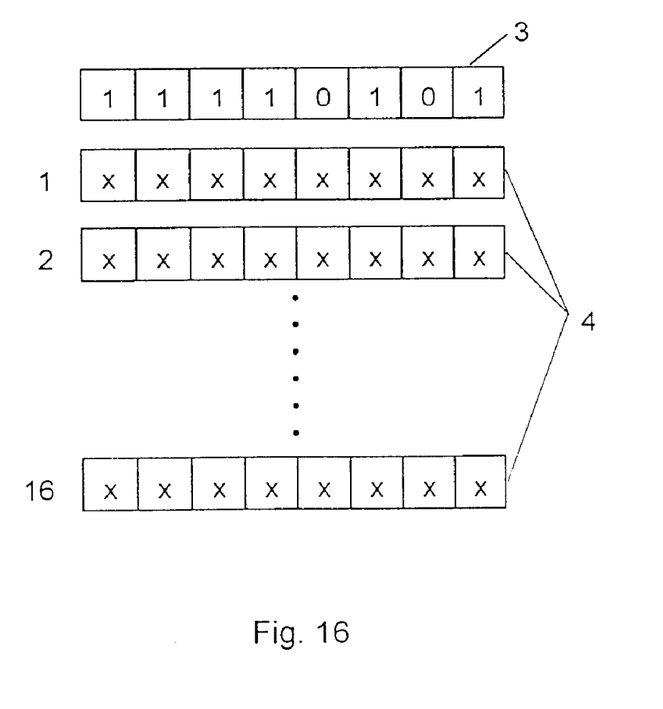
FIG. 16 shows the coding for the "direct" mode with an undersampling by a factor of 2.

In special cases, it may be necessary to store a block of 8×8 pixels directly as a matrix of color separation densities, for example, when it contains more than two colors and therefore cannot be coded with the two-color compression but, on the other hand, is also not intended to be coded with the JPEG method, in order not to falsify it. For such a case, the method according to the invention provides a "direct" mode d having the coding illustrated in FIG. 15. The introductory command code word 3 is followed by 64 data words 4 which contain the color separation densities of the 64 pixels. This mode can also be combined with a reduction in resolution by a factor of 2 in the horizontal and the vertical directions, with the result that only the color separation densities of the 16 undersampled pixels 5 in accordance with FIG. 9a are appended to the command code word. FIG. 16 shows the corresponding coding.

The method according to the invention has been described for the separate compression of color separation images. However, it can also be performed with differently sorted data formats of the image data, for example, with a data format wherein three (RGB) and four (CMYK) color separation bytes, respectively, are stored sequentially for each pixel. In the previously explained code word sequences, only each data word containing a color separation density is replaced by a specification of the color with three and four bytes, respectively.

The method according to the invention is also not limited to the coding of blocks with 8×8 pixels. It can be applied to arbitrary block sizes which are also not square when the length of the command code words and data words for coding two-color blocks (note FIG. 6, FIG. 7, FIG. 9, and FIG. 10) and the number of the data words for the "direct" coding of the blocks (FIG. 15, and FIG. 16) are appropriately matched.

Likewise, assignment of the nonvariable bits in the command code words is not limited to the assignments illustrated in the figures. The assignment can be selected in a different manner, as long as the various command code words remain distinguishable.

We claim:

1. A method for compressing digital image data present as a matrix of M×N pixels, to a reduced data set, which comprises a) dividing the matrix of M×N pixels into blocks of u×v pixels, b) classifying the blocks of u×v pixels into blocks containing only pixels of one block color, or single-color blocks, blocks containing pixels of a foreground color and pixels of a background color, or two-color blocks, and blocks containing pixels with more than two colors, or multicolor blocks, and c) coding, in the image data of the single-color blocks and the two-color blocks, by command code words and data words, pixel patterns which are repeated in at least one manner selected from the group consisting of from block to block and within a block, respectively.

2. The method according to claim 1, which includes coding consecutive single-color blocks with a like block color as that of run lengths.

3. The method according to claim 1, which includes coding the two-color blocks as bit patterns, assigning to each bit of the bit pattern a pixel of the two-color block, the bits of the bit pattern indicating whether the assigned pixel has one of the foreground color and the background color, respectively.

4. The method according to claim 3, which includes forming the bit pattern only with bits for the pixels of such lines of the two-color block, the distribution of foreground color and background color of which is different from the corresponding distribution in the preceding line of the two-color block.

5. The method according to claim 3, which includes forming the bit pattern only with bits for a subset of undersampled pixels of the two-color block.

6. The method according to claim 1, which includes coding consecutive two-color blocks with a like bit pattern as that of run lengths.

7. The method according to claim 1, which includes providing the single-color blocks in different regions of the image data with a different block color.

8. The method according to claim 1, which includes providing that the foreground color and the background color are different in different regions of the image data.

9. The method according to claim 1, which includes coding as run lengths, consecutive multicolor blocks which are supposed to be skipped in the compression of the single-color blocks and the two-color blocks.

10. The method according to claim 1, which includes compressing the multicolor blocks by using a method of transformational coding.

11. The method according to claim 1, which includes avoiding compression of the multicolor blocks.

12. The method according to claim 1, which includes replacing a portion of the pixels in a multicolor block by the background color, and then coding the block like a two-color block.

13. The method according to claim 1, which includes replacing a portion of the pixels in a multicolor block by an arbitrary color, and then coding the block like a multicolor block.

14. The method according to claim 1, which includes coding one of the properties of transparency and nontransparency, respectively, for the background color.

* * * * *